(12) United States Patent
Vizoso et al.

(10) Patent No.: US 6,939,493 B2
(45) Date of Patent: Sep. 6, 2005

(54) METHOD FOR THE PRODUCTION OF COMPOSITE MATERIALS

(75) Inventors: Ricardo Blach Vizoso, Segovia (ES); Vladimir-Nikolaevich Fateev, Moscow (RU); Porembikiy-Vladimir Igorevich, Moscow (RU); Bogatchev-Eugeniy Akimovich, Moscow (RU); Tsypkin-Mikhail Alexandrovich, Moscow (RU)

(73) Assignee: Poligono Industrial Nicomedes Garcia—Naves BvC, Segovia (ES)

( * ) Notice: Subject to any disclaimer, the term of this patent is extended or adjusted under 35 U.S.C. 154(b) by 182 days.

(21) Appl. No.: 10/359,002

(22) Filed: Feb. 5, 2003

(65) Prior Publication Data

US 2003/0214063 A1 Nov. 20, 2003

Related U.S. Application Data

(63) Continuation of application No. PCT/ES00/00345, filed on Sep. 13, 2000.

(51) Int. Cl.$^7$ .......................... B29C 43/18; B29C 70/42
(52) U.S. Cl. ...................... 264/137; 264/135; 264/136; 264/257; 264/319
(58) Field of Search .............................. 264/128, 134, 264/135, 136, 137, 257, 258, 319, 332, 345; 156/160, 161, 181

(56) References Cited

U.S. PATENT DOCUMENTS

| 4,919,739 A | * | 4/1990 | Dyksterhouse et al. ..... 156/181 |
| 4,943,472 A | | 7/1990 | Dyksterhouse et al. |

FOREIGN PATENT DOCUMENTS

| EP | 0 875 524 A2 | 11/1998 |
| EP | 0 885 704 A1 | 12/1998 |
| WO | WO 94/17999 | 8/1994 |
| WO | WO 00/24075 | 4/2000 |
| WO | WO 00/38261 | 6/2000 |

OTHER PUBLICATIONS

Savage, "Carbon–Carbon Composites" Chapman & Hall, 1993, pp. 231–237.

Bulanov, et al., "Technology of Rockets and Aerospace Constructions with Composite Materials" –M.: Edition of Moscow N.E. Bauman State Technological University, 1998, pp. 91–92.

* cited by examiner

*Primary Examiner*—Angela Ortiz
(74) *Attorney, Agent, or Firm*—Katten Muchin Rosenman LLP

(57) ABSTRACT

The method includes the preparation of a preimpregnated product that undergoes a heat treatment between 70 and 1100 deg. C., is embedded with an inert substance that comprises a charge and a polymeric binder in a quantity greater than the volume of the voids of the single-layer yarn which is calculated by means of the formula [1], where $m_n$ is the mass of inert substance, $d_n$ is the density of the inert substance, a is the length of the preimpregnated product, b is the width of the preimpregnated product, h is the thickness of the preimpregnated product, $m_{pr}$ is the mass of the preimpregnated product, and $d_{fib}$ is the density of the fiber, and is heated between 160 deg. C. and 200 deg. C., a pressure of between 1 and 5 MPa being applied simultaneously.

$$m_n = d_n \cdot \left( a \cdot b \cdot h - \frac{m_{pr}}{d_{fib}} \right). \quad [1]$$

4 Claims, 2 Drawing Sheets

METHOD FOR THE PRODUCTION OF COMPOSITE MATERIALS

This application is a continuation of international application number PCTES00/00345, filed Sep. 13, 2000.

This invention relates to the production of a wide class of composite materials having a matrix that contains carbon and is of controlled porosity. This invention can be used, in particular, in the production of the current collectors of fuel cells with electrode aggregates, porous electrochemical electrodes or filtration devices.

Methods of obtaining composite materials (composites) are known, both single layer and multi-layer, reinforced in two directions (2D). Methods are also known for the production of composite materials (that consist of a matrix of carbon and a fibre filling or charge) which include the preparation of the pre-impregnation (half-finished article that consists of a fibrous charge impregnated with a binder in a defined ratio by weight), its compression, hardening and charring (G. Savage, Carbon—Carbon Composites—Chapman & Hall, 1993, pages 231–237).

Figure 1:
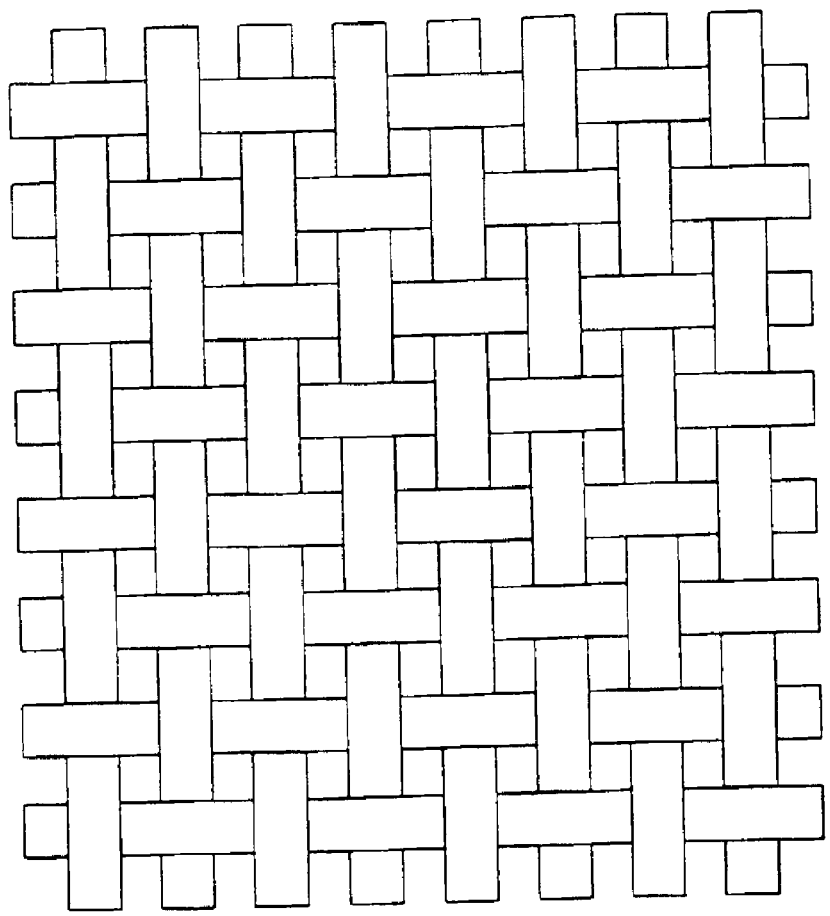

However, due to the inherent properties of the yarns, these have significant cavities or pores (groups of voids) (with an extension of some few millimeters) and some discontinuity cracks from one end to another within their boundaries (FIG. 1). The composite polymeric material is strong and smooth in the plastic state, but when it is charred, after the destruction of the polymeric matrix and due to the resulting contraction, which leads to the appearance of a free volume (more than 50% of the volume of the previous polymeric matrix) then the composite polymeric material is characterised by low stiffness and significant superficial roughness.

Another method for obtaining composite materials includes impregnation, hardening, charring and cyclic graphitisation followed by subsequent mechanical treatment of the obtained composite material (Bulanov I. M., Vorobey V. V., Technology of rocket and aerospace constructions made of composing materials—M.: Edition of Moscow N. E. Bauman State Technical University, 1998, pp. 91–92). Although this method allows the stiffness of the charred composite material to be increased and provides a low degree of roughness, it can only be carried out at the cost of a very high saturation and with an intense energy from the gas or liquid phase. Also, this result is obtained through the mechanical treatment of the compressed composite material. Controlled porosity is also absent in this case.

The present invention is aimed at obtaining an economical composite material with specific properties. The technical results that it is intended to achieve include a reduction in the energy consumption and the production of a composite material with controlled porosity.

To achieve these results a composite material production method is employed that includes the preparation of the preimpregnation, its pressing, hardening and charring. The characteristic that distinguishes the method facilitated by this invention from other known methods is that, after the preparation of the preimpregnation, this undergoes heat treatment at a temperature of between 70 deg. C. and 1100 deg. C. and is embedded with a defined quantity of an inert substance that comprises a charge and a binder based on a polymeric material, for example, a thermostable resin. Next, the sample is heated to a temperature of between 160 deg. C. and 200 deg. C., increasing the internal contact pressure at the same time up to a pressure of between 1 and 5 MPa with temporisation. In this method the quantity of the inert substance exceeds the volume of the porosity of the single-layer yarn and it can be calculated by means of the formula [1]:

$$m_n = d_n \cdot \left( a \cdot b \cdot h - \frac{m_{pr}}{d_{fib}} \right) \quad [1]$$

where $m_n$ is the mass of the inert substance;

$d_n$ is the density of the inert substance;

a is the length of the preimpregnation;

b is the width of the preimpregnation;

h is the thickness of the preimpregnation;

$m_{pr}$ is the mass of the preimpregnation; and $d_{fib}$ is the density of the fibre.

In FIG. 1 the structure of the original sample is shown.

Figure 2:
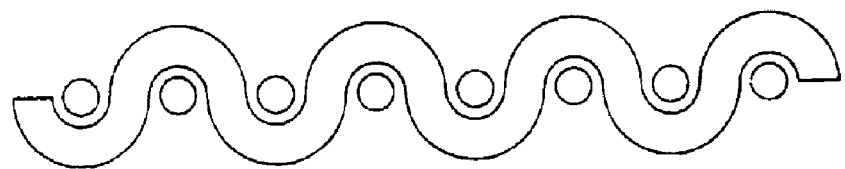

In FIG. 2 a side view of the original structure is shown.

Figure 3:
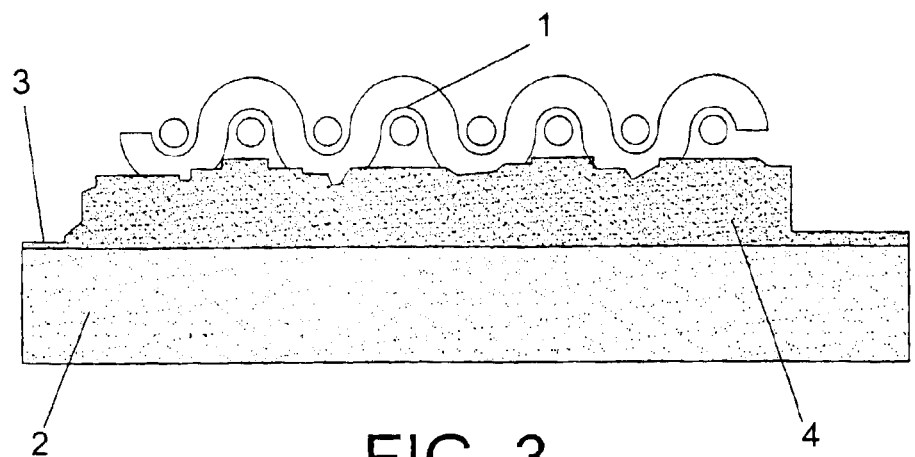

In FIG. 3 the inert substance is shown on top of the surface of the substrate with heat-treated preimpregnation.

Figure 4:
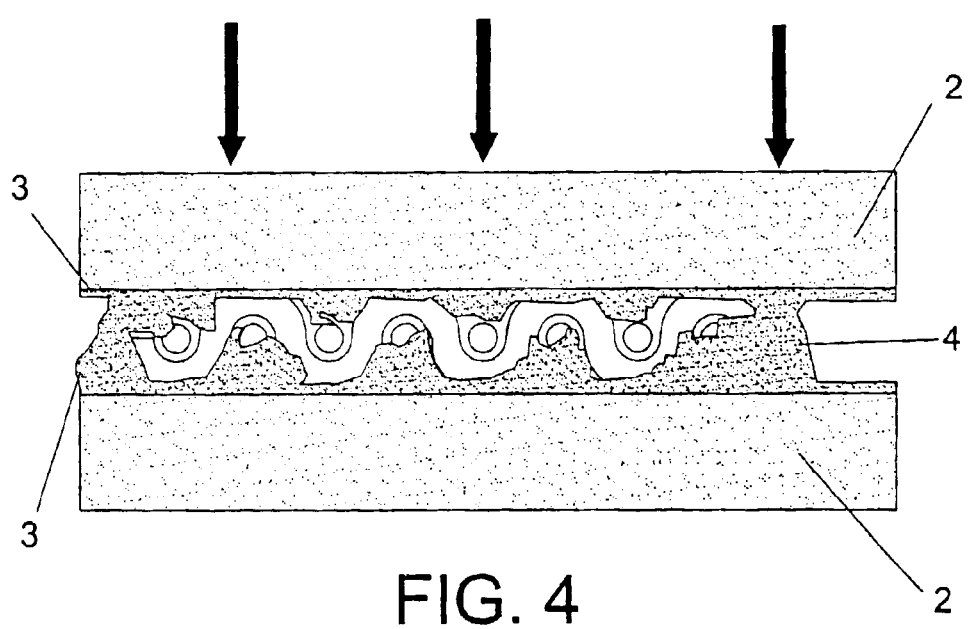

In FIG. 4 the filling of the void with the inert substance is presented.

Figure 5:
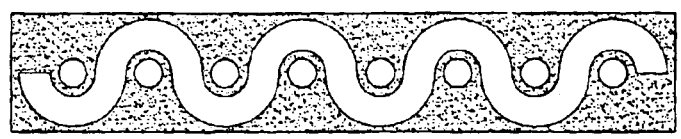

In FIG. 5 the single-layer composite material is shown in the already manufactured state.

The invention can be explained with reference to the Figures that accompany this description.

According to the present invention, the composite material can be obtained in the following manner. The initial material (such as a material with a matrix that contains carbon) is chosen and is impregnated with a binder, with which the preimpregnated product is obtained that is subjected to a heat treatment at a temperature of between 70 deg. C. and 1100 deg. C. After the heat treatment of the preimpregnated product, a fabric is formed (FIGS. 1 and 2). Although the appearance of the fabric does not change, the hardness does appear. The single-layer yarn (1) is placed on an inert substrate (2) provided with a relief cladding (3) and the inert substance (4).

As relief cladding (3) or coating of the sheets of the inert substrate, use can be made of any appropriate substance, for example, polytetrafluoroethylene (PTFE) in thin lamina. A coating of polyvinyl alcohol can also be used (PVA).

The main constituents of the inert substance (4) are the polymer, the charge and the porophore. The polymer is the compound that acts as binder that is employed both in the impregnation stage and in the stage following the charring. Therefore, the polymer should produce a high quantity of amorphous carbon. There are not many natural polymers of this type in existence. In a particular embodiment, this polymer is a phenol-formaldehyde resin since they are commercially available and cheap products. From a practical point of view, it is convenient to use the polymer in solution in an appropriate medium since, in that case, the preparation of the inert substance and the prior treatment can be carried out at ambient temperature. As charge any disperse material can be employed that includes carbon, in fibre or powder form, with different sizes and shapes, for example, graphite or amorphous carbon powder, smoke-black, discontinuous fibres or resin powder, preferably in the form of fibres because their size in the traversal direction is constant and the oblong character of its particles promotes the reinforcement of the composite material in the voids of the support. In general, when a discontinuous fibre is used, the unevenness and the durability of the interfibrillar space increase. As porophore (substance that contributes porosity to the composite material) any disperse liquid or solid compound can be used, compatible with the polymer solution, for example, PTFE in powder form, polymethyl-methacrylate (PPMA), polyethylene glycol (PEG) or ammonium bicarbonate. The main requirement that the porophore should meet is that it evaporates completely during the heating of the composite material.

The quantity of inert substance that is used in the putting into practice of the method provided by this invention is greater than the volume (free area) of the void in the single-layer yarn. In a particular embodiment the quantity of inert substance that is used exceeds by 10% to 30% the volume of the void in the single-layer yarn. The quantity of the inert substance to be used can be calculated by means of the previously stated formula [1].

Next, the heat-treated preimpregnated product and the inert substance are put into contact, on some inert substrates, and a contact pressure is applied to said materials (FIG. 4). The hard fabric of the heat-treated preimpregnated product is moved inside the medium suspended in the direction of the applied pressure until its prominent knots touch the surface of the substrate (at low stress), or press the inert substance under the mesh (at high stress).

The sample is then heated to a temperature of between 160 deg. C. and 200 deg. C., increasing the internal contact pressure at the same time up to a pressure of between 1 and 5 MPa with temporisation. The temporisation (maintenance of the mixture at a pressure, temperature and during a determined period of time) is necessary for several reasons, among them because (i) the temporisation gives as a result the regrouping of the mass of inert substance inside the cloth-based reinforcement support, and (ii) the hardening of the mass takes place whilst the temperature increases up to the definitive level. To obtain smooth homogeneous (with regard to thickness) composite material, it is necessary to produce the hardening between the inert substrates of the press. The temporisation depends on the rate of temperature increase above 100 deg. C. and on the composition of the inert substance. After heating up to 160 deg. C.–200 deg. C., a gradual increase of pressure up to 1 to 5 MPa is applied. This process causes the material to become hard. The increase in temperature and pressure leads to a procedure of formation of the composite material by means of a mechanism of molecular diffusion of the flow of inert substance. This procedure includes the evolution of the linear molecules and the deformation of the discontinuous fibres is caused by the subsequent movement on their parts in the direction of the applied pressure (with time).

It is known that the polymers that form amorphous carbon (binders) are visco-elastic materials. This distinguishes the polymers from the other solids. When polymers are deformed mechanically, they are not only viscous but also elastic. The resistance to the change in shape, that is produced by the mechanical tension, depends on the dynamic conditions of the deformation process. The viscous flow of the polymers is always followed by the deformation of the elements. The reason for this is the movement of the long chain molecules. Their straightening or orientation is always involved. Therefore, the viscosity, which is calculated as a ratio between the tension and the rate of irreversible deformation, is not constant, but rather it increases during the process. When the flow becomes stationary, the viscosity of the polymer does not change further, but its value depends on the applied tension. The increase of the temperature results in the decrease of viscosity.

The movement of the charge of hard fibre inside the viscous inert medium, after the preparation of the preimpregnated product and of the thermal treatment, takes place with the corresponding redistribution of the inert substance that fills the voids and the discontinuity cracks present in the yarn. When use is made of the yarn or the tape in the original state, the composite material cannot be obtained by means of the method facilitated by this invention since the charge of hard and durable fibre cannot redistribute the inert substance after the pressure has been applied.

The hardening takes place between some inert substrates or heavy means of parallel planes, in such a manner that the hardened sample achieves the desired thickness and surface purity, which depends solely on the unevenness of the relief cladding of the accessory.

The later charring of the hardened sample is the reason why the unevenness of the single-layer composite material, which presents, also, flexural resistance to pressure, a low superficial roughness and an adjustable porosity.

The method provided by this invention allows the employment to be avoided of the expensive compression and mechanical treatment procedure.

An important characteristic of the method provided by this invention resides in that it allows a composite material to be obtained with a controlled porosity. To this end, if a porophore, just like those mentioned previously, is added to the inert substance, it is possible to increase the permeability to gases. The capacity to obtain a composite material with a high and controlled porosity, once crushed, is very important, for example, for obtaining electrochemical electrodes and porous filters, current collectors of MEA fuel cells based on the composite material prepared according to the method provided by this invention.

EXAMPLE 1

In a particular embodiment of the method provided by this invention, a sample of a composite material was obtained in the manner described below.

Carbon paper, fabricated with carbonised viscose, was impregnated with a solution in alcohol of a phenol-formaldehyde resin (LBS-1®) [LBS-1®, "Carbolite", which is a commercial produce produced in Russia by the company Orekhovo-Zuyevo (Moscow), government standard 901-78] and bakelite varnish in an impregnator. The preimpregnated product so prepared was cut into plates of 300×300 mm and dried in a dessicator at 70–80 deg. C.

To obtain the inert substance that fills the voids of the dry preimpregnated product, 20 g of discontinuous carbon fibre (with a length not greater than 1 mm) were mixed completely with 10 g of graphite powder (the particle size of which was between 5 and 10 mkm). Next, the 30 g of this mixture were mixed with 65 g of another mixture made up of LBS-1® and an epoxidic resin (ED-20®) [ED-20®, "Ufachimprom", a commercial product produced in Russia by the company Orekhovo-Zuyevo (Moscow), government standard 10587-84], in a proportion ED-20®, 80% (by weight), and LBS-1®, 20% (by weight). After mixing, 30 g of the inert substance were placed on the surface of the yarn with fluoride varnish (300×300 mm) in a thin coat of uniform thickness. Next, the plate of dry preimpregnated product was placed on top of the layer of inert substance, between some polished metallic faces and a pressure of 2,5 MPa was applied. The hardening was achieved by heating the composite material to 160 deg. C. over 8 hours, maintaining it at 160 deg. C. for 1 hour.

Charring at 1000 deg. C. for 1–2 hours completed the formation of the composite material. The gradual and controlled increase of the temperature (2 deg. C./minute) minimised undesired warping. This procedure was carried out with a graphite coating.

The subsequent examination of the plate of carbon-carbon composite material demonstrated the absence of heterogeneity and of defects in the sample and on its surface, and an amplitude of the unevenness less than 10–20 mkm. The sample had the desired durability and roughness (the elasticity of the sample remained after multiple flexions of 10 cm in radius, the sample did not crack), the porosity, once crushed homogeneously, was of 30–40%. It was verified that carbon was the only component of the sample.

EXAMPLE 2

Comparative Example

A comparative trial was made between the method of the invention and a traditional method of production of composite materials. For this, a satin cloth, braided, that contained carbon, based on carbonised viscose, was impregnated in an impregnator, with an solution in alcohol of a phenol-formaldehyde resin (LBS-1$^{MR}$) (LBS-1, is the commercial product produced in Russia "Carbolite", by the company Orekhovo-Zuyevo (Moscow)). The preimpregnated product so prepared was cut into plates of 300×300 mm and dried in a desiccator at 70–80 deg. C.

Next, the plate of dry preimpregnated peoduct was placed between the polished metallic faces of a hydraulic press and a pressure of 2,5 MPa was applied (traditional Method). The heating of the sample in the compressed state up to a temperature of 160 deg. C. over 8 hours with temporisation, that is to say, maintaining it at 160 deg. C. for 1 hour, caused the hardening thereof.

Another plate of dry preimpregnated product was placed on top of a homogeneous layer of 30 g of inert substance, prepared as was described in Example 1, and it was placed between the polished metallic faces of a hydraulic press, a pressure of 2.5 MPa then being applied (method of the invention). The heating of the sample in the compressed state up to a temperature of 160 deg. C. over 8 hours with temporisation, maintaining it at 160 deg. C. for 1 hour, caused the hardening thereof.

Next, the hardened samples of composite obtained by the traditional method and by the method of the invention, were charred at 1000 deg. C., in a non-oxidising atmosphere, for 2 hours. The gradual and controlled increase of the temperature (2 deg. C./minute) during the charring allows the undesired warping caused by the irregularities of the contraction to be minimised.

The external examination of the obtained two plates of carbon-carbon composite material demonstrated that the plate prepared by means of the traditional method is durable and smooth in the plastic state whilst in the charred state, after destruction of the polymeric matrix and subsequent contraction, that causes the formation of free space (more than 50% of the volume that previously was filled by the polymeric matrix), is characterised by its low durability, unevenness and considerable roughness of the surface. The porosity of the plate is 30–40%. Discontinuity cracks can be observed easily, arranged heterogeneously. The increase of the unevenness and durability of the charred composite material are only obtained in a real way after multiple saturation starting from the liquid, with which the porosity diminishes (by up to 12–15%). It was only possible to reduce the roughness after a later mechanical treatment of the packed composite material.

The examination of the plate obtained by means of the method of the invention, shows the absence of heterogeneity and of defects inside the sample and on its surface. The heterogeneity is not superior to 10–20 mkm. The sample had the desired durability and unevenness (the elasticity of the sample remained after multiple flexions of 10 cm in radius, the sample did not crack), the porosity, after homogeneous crushing, was of 30–40%.

The difference observed in the quality of the plates, obtained with the different methods, is caused by the properties of the cloth. The braided cloth of satin, serge or linen contains significant voids (with a width of some few mm) and discontinuity cracks from one end to the other, limited by its own thickness. This defect can be eliminated by means of the method of the invention without the necessity of using expensive compression operations and subsequent mechanical treatment. Often a high and variable porosity is required (but not a high density) for the use of a composite material with a matrix that contains carbon, for which the method of the invention is effective.

What is claimed is:

1. A method for the production of porous composite materials comprising
   a) preparing a preimpregnated product,
   b) heat treating the preimpregnated product at a temperature of between 70 deg. C. and 1100 deg. C,
   c) embedding the heat treated preimpregnated product with a defined quantity of an inert substance that comprises a charge, a porophore and a binder based on a polymeric material,
   d) heating the embedded heat treated preimpregnated product to a temperature of between 160 deg. C and 200 deg. C. with concurrent application of a pressure of between 1 and 5 MPa with temporisation,
   where the quantity of the inert substance exceeds the volume of the voids f the single-layer yarn and is calculated by means of the formula (1)

$$m_n = d_n \cdot \left( a \cdot b \cdot h - \frac{m_{pr}}{d_{fib}} \right) \quad [1]$$

where
   $m_n$ is the mass of the inert substance;
   $d_n$ is the density of the inert substance;
   a is the length of the preimpregnated product;
   b is the width of the preimpregnated product;
   h is the thickness of the preimpregnated product;
   $m_{pr}$ is the mass of the preimpregnated product; and
   $d_{fib}$ is the density of the fibre.

2. Method in accordance with claim 1, characterised in that the quantity of inert substance surpasses the voids of the single-layer yarn in 10% to 30% by volume.

3. Method in accordance with claim 1, where the embedded preimpregnated product is heated at a temperature of 1000 deg. C. over a period of time comprising between 1 and 2 hours and gradual and controlled increase of the temperature.

4. Method in accordance with claim 3, where the gradual and controlled increase of the temperature is carried out at a rate of not more than 2 deg. C. per minute.

* * * * *